United States Patent
Godor et al.

(10) Patent No.: US 8,619,569 B2
(45) Date of Patent: Dec. 31, 2013

(54) METHOD AND APPARATUS FOR STREAM ADAPTION IN A PACKET SWITCHED NETWORK

(75) Inventors: István Godor, Budapest (HU); Ákos Kovacs, Budapest (HU); Franz Kalleitner, Attergau (AT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 333 days.

(21) Appl. No.: 12/670,038

(22) PCT Filed: Jul. 23, 2007

(86) PCT No.: PCT/EP2007/057578
§ 371 (c)(1),
(2), (4) Date: Mar. 29, 2010

(87) PCT Pub. No.: WO2009/012812
PCT Pub. Date: Jan. 29, 2009

(65) Prior Publication Data
US 2010/0202456 A1    Aug. 12, 2010

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl.
USPC ........... 370/231; 370/235; 370/389; 370/392; 370/395.3; 709/228

(58) Field of Classification Search
USPC ........... 370/231, 235, 389, 392, 395.3, 395.5; 709/228, 231
See application file for complete search history.

(56) References Cited

U.S. PATENT DOCUMENTS 6,510,553 B1 * 1/2003 Hazra .............................. 725/87
2006/0262803 A1 * 11/2006 Lee et al. ...................... 370/401
(Continued)

FOREIGN PATENT DOCUMENTS

| EP | 1727316 A1 | 11/2006 |
|---|---|---|
| WO | 2007/025560 A1 | 3/2007 |
| WO | WO 2007025560 A1 * | 3/2007 |

OTHER PUBLICATIONS

Ash, G et al. "QoS NSLP QSPEC Template." IETF Internet Draft NSIS Working Group, Internet Draft, Mar. 2007 http://tools.ietf.org/html/draft-ietf-nsis-qspec-16.*

(Continued)

*Primary Examiner* — Benjamin H Elliott, IV
(74) *Attorney, Agent, or Firm* — Coats and Bennett, P.L.L.C.

(57) ABSTRACT

A method is disclosed for use in a packet switched network, comprising carrying descriptor information relating to options for stream adaptation, for example media stream adaptation, in the packet switched network using at least one of the Next Step in Signalling, NSIS, and Resource Reservation Protocol, RSVP, signalling protocols. Carrying the descriptor information may comprise receiving (S120), processing (S130), generating (S110), distributing (S140), transmitting (S140) or using the descriptor information in any way. The method aims to provide a generally applicable solution for cross-layer information forwarding, with one realization of the general solution using the Layer Independent Descriptor as the forwarded information. Specific NSIS and RSVP object formats are also proposed.

37 Claims, 14 Drawing Sheets

(56) References Cited

U.S. PATENT DOCUMENTS

| | | | |
|---|---|---|---|
| 2008/0101289 A1* | 5/2008 | Hirano et al. | 370/331 |
| 2010/0017529 A1* | 1/2010 | Takacs et al. | 709/231 |
| 2010/0202456 A1* | 8/2010 | Godor et al. | 370/392 |

OTHER PUBLICATIONS

Takacs, A. ; Kovacs, A. ; Kalleitner, F. ; Brand, H. ; TrafficLab, Ericsson Res. Hungary, Budapest, Hungary; "Forward information—a general approach for scalable audiovisual service delivery"; 2nd International Syposium on Wireless Coomunication Systems, 2005; Issue date: Sep. 5-7, 2005; Current version Dec. 5, 2005; ISBN 0-7803-9206-X.*

Ash, G et al. "QoS NSLP QSPEC Template." IETF Internet Draft NSIS Working Group, Internet Draft, Mar. 2007.

* cited by examiner

*) Scope of enhancements

| Length of object | | | | LID-SPEC class | 1 |
|---|---|---|---|---|---|
| TC | PI | RAM | D | Number of Labels | Reserved |

| Length of object | | LID-SPEC class | 2 |
|---|---|---|---|
| Label From | Label To | Code Point | Reserved |
| ... | | | |
| Label From | Label To | Code Point | Reserved |

| Length of object | | | LID-SPEC class | 3 |
|---|---|---|---|---|
| Label #1 | S | Frame Type | PD | Reserved |
| ... | | | | |
| Label #n | S | Frame Type | PD | Reserved |

FIG. 24

| 0 | 1 | 2 | 3 |
|---|---|---|---|
| 0 1 2 3 4 5 6 7 8 9 | 0 1 2 3 4 5 6 7 8 9 | 0 1 2 3 4 5 6 7 8 9 | 0 1 |

| Length of object | LID-SPEC class | 6 |
|---|---|---|
| Label #1 | Unit | Bandwidth |
| ... | | |
| Label #n | Unit | Bandwidth |

METHOD AND APPARATUS FOR STREAM ADAPTION IN A PACKET SWITCHED NETWORK

TECHNICAL FIELD

The present invention relates to a method and apparatus for use in a network.

BACKGROUND

Networking architectures typically have a layered design that more or less follows the International Standard Organization's Open System Interconnect (ISO/OSI) model. In this architecture it is difficult to pass information between layers that are not adjacent. In this respect, cross-layer Information Forwarding (IF) techniques are not common in today's networks. Generally, local solutions are provided to fulfil specific needs, which are typically focused on radio access; see, for example, the Voice over IP (VoIP) handling of 3rd Generation Partnership Project (3GPP) networks. However, for example for media delivery and adaptation, it is accepted, that cross-layer information can be desirable in the whole delivery chain in order to provide better Quality of Service (QoS) and user-perceived quality.

In this respect, in reference [A. Takács, F. Kalleitner, "Multimedia Transport Optimization through Forward Information Signalling", PCT/EP2005/009387, August 2005, published as WO 2007/025560] it is described that, to build a media delivery framework that can utilize scalable media codecs for local adaptation requires intelligent adaptation functionalities, it is beneficial to provide detailed information about the media to be forwarded not only to the application layer, but to lower layers as well. This information allows e.g. the network layer to efficiently adapt to network congestions and the link and physical layers to apply efficient error protection schemes tailored for media delivery. Cross-layer communication appears to be the most appropriate way to distribute the above media information. It is beneficial for efficient media delivery to consider the properties of the networks and the applications together. In order to make an adaptation anywhere within the network, information must be provided about the feasible adaptation operations. This information is application and codec specific, and hence appropriate means for communication must be provided to permit application-aware adaptation of service delivery.

Currently, dedicated nodes with special functions are capable of supporting media stream adaptation. Translators, Mixers and Media Gateways (MGs) adapt the media traffic. E.g., for video stream adaptation a Media Aware Network Element (MANE) is defined [S. Wenger, M. M. Hannuksela, T. Stockhammer, M Westerlund, D. Singer, "RTP Payload Format for H.264 Video", IEEE RFC 3984, February 2005]. The concept of a MANE goes beyond a normal functionality of a router or a gateway. That is, a MANE has to be aware of signalling. A MANE allows packet adaptation according to the needs of the media encoding format.

The MPEG-21 domain can be considered as a practical realization of the MANE concept. Within MPEG-21 more sophisticated adaptation methods are standardized than a simple End to End (E2E) feedback based adaptation. The main functionality of MPEG-21 domain is to deliver adapted content to the end user. The content adaptation must provide the best user perceived quality according to the physical constraints. These constraints are, e.g., terminal capabilities, network characteristics and user characteristics such as user interest or preference for a given media type. MPEG-21 uses an Adaptation Engine as logical unit to adapt the media content based on user and natural environment characteristics, terminal capabilities, and network characteristics. The Adaptation Engine operates on so-called Digital Items (DI). A DI contains the media itself and its metadata descriptor.

Real Time Protocol (RTP) session multiplexing and RTP Synchronization Source (SSRC) multiplexing [H. Schulzrinne, S. Casner, R. Frederick, V. Jacobson, "RTP: A Transport Protocol for Real-Time Applications", IEEE RFC 3550, July 2003] are used to differentiate media layers produced by a single media source. In case of session multiplexing, each layer is associated with an individual RTP session. Each RTP session requires separate signalling, whereby each RTP session carries one RTP packet stream. In case of SSRC multiplexing, all layers are distributed in the same RTP session that comprises more than one RTP packet stream and each layer is identified by its SSRC. In both cases, the dependency of sessions must be signalled.

The applicant has identified the following problems with the existing solutions.

MANE: The main disadvantages of MANE are that it has to be aware of session control signalling and operates on application level. The nodes supporting MANE are rather complex, since transport and signalling interfaces must be supported or be controlled by external controllers. Moreover, the introduction of external controllers causes additional interfaces, adds processing and signalling delay and increases the maintenance cost.

MPEG-21: As MPEG-21 can be considered as a practical realization of MANE, thus MPEG-21 operates on application level as well. Moreover, for each MPEG-21 supporting node, the formulation of the adaptation decision must be repeated. Furthermore, the description of the adaptiveness of the media stream must be transferred (continuously) parallel to the media stream, which may result considerable overhead especially in case of voice transmission. Due to the centralized functions of MPEG-21, the scalability of the solution is low and the reaction time to altered channel conditions is relatively slow. In summary, this solution is rather complex.

RTP: There are two main functionalities to adapt media traffic, which can be applied at the borders of transport-level "clouds". The first functionality (RTP Translator) is practically the similar transcoding procedure as it is realized by MPEG-21. The second functionality (RTP Mixer) could differentiate layers, however, the senders and the receivers do not have any control over the adaptation procedure, unless some mechanism is implemented to control this functionality.

The shortcomings of application layer driven media adaptation, as identified by the present applicant, can be summarized as follows:

Complex system architecture e.g. adaptation decision engine.

Increased bandwidth demands e.g. signalling of adaptiveness.

Increased end-to-end delay e.g. multiple adaptation decision and formulation steps.

In addition to the list of references included at the end of the description, the following documents are also at least of background relevance: U.S. Pat. No. 5,940,610 and US 2002/0099842.

SUMMARY

According to a first aspect of the present invention there is provided a method for use in a packet switched network, comprising carrying descriptor information relating to options for stream adaptation in the packet switched network using at least one of the Next Step in Signalling, NSIS, and Resource Reservation Protocol, RSVP, signalling protocols.

The method may comprise carrying the descriptor information using the NSIS signalling protocol.

The method may comprise carrying the descriptor information in at least one dedicated QoS-NSLP QoS Model, QOSM, where NSLP is an abbreviation for NSIS Signalling Layer Protocol.

The method may comprise carrying the descriptor information in at least one non-dedicated QoS-NSLP QoS Model, QOSM, where NSLP is an abbreviation for NSIS Signalling Layer Protocol.

The method may comprise carrying the descriptor information in at least one dedicated QoS Specification, QSPEC, parameter.

The dedicated QSPEC parameter may be provided in a non-dedicated QSPEC object.

The non-dedicated QSPEC object may be a QoS Desired QSPEC object.

Parameters in the non-dedicated QSPEC object other than the dedicated QSPEC parameter may be set to their minimum respective allowable values.

The method may comprise carrying the descriptor information in at least one dedicated QoS Specification, QSPEC, object.

The method may comprise setting a flag in a header of the dedicated QSPEC parameter or object so as to indicate an at least partial lack of support for and/or acceptance of the dedicated QSPEC parameter or object.

The method may comprise setting a flag in a header of the dedicated QSPEC parameter or object so as to indicate a support for and/or acceptance of the dedicated QSPEC parameter or object.

The method may comprise carrying the descriptor information in a NSIS RESERVE message.

The method may comprise carrying the descriptor information in a NSIS QUERY message.

The method may comprise carrying the descriptor information using the RSVP signalling protocol.

The method may comprise carrying the descriptor information in a RSVP PATH message.

The method may comprise using a dedicated descriptor information header in a PATH SENDER-TSPEC object.

The method may comprise carrying the descriptor information in a sender descriptor part of the PATH message.

The method may comprise using a dedicated descriptor information object in the sender descriptor part.

Carrying the descriptor information may comprise receiving, processing, generating, distributing, transmitting or using the descriptor information in any way.

The descriptor information may comprise cross-layer information.

The descriptor information may comprise General Cross-layer Information Forwarding, GCIF, information.

The descriptor information may comprise Layer Independent Descriptor, LID, information.

The LID descriptor information may comprise a LID Traffic Class information field and optionally any information fields such as Label to Codepoint Converter, Packet Drop Preference, Protection Preference, Truncation Preference, Bandwidth Partitioning.

The LID descriptor may comprise a LID label in each information field which LID label groups the information fields in order to form the LID descriptor which describes the given stream.

The descriptor information may comprise LID Traffic Class that comprises the following portions: a Traffic Class portion comprising the traffic class category to which the said descriptor is applied; a Procedure Indicator portion comprising the LID distribution mode depending on the applied LID type; a Rate Adaptation Method portion comprising which rate adaptation mechanism is to be applied on the packet payloads belong to the transmitted stream; a Delivery of Erroneous Media Frames portion comprising an indication whether a corrupted media frame should be forwarded or dropped immediately; and a Number of Labels portion comprising the number of valid LID labels used by the stream sending application The descriptor information may comprise Label to Codepoint Converter that comprises the following portions: a Label From portion comprising the LID label that is to be mapped to a given DiffServ Code Point value; a Label To portion comprising the last LID label and the corresponding DiffServ Code Point value if a given range of LID labels is to be mapped; and a Code Point portion that comprises the appropriate DiffServ Code Point to which the corresponding LID label is to be mapped The descriptor information may comprise Packet Drop Preference that comprises the following portions: a Label portion comprising the LID label; a Significant portion comprising whether the carried payload of a packet is important for the decoding process; a Frame Type portion comprising the type of the frame carried by the payload; and a Drop Preference portion comprising the corresponding importance of the frame carried by the payload.

The descriptor information may comprise Protection Preference that comprises the following portions: a Label portion comprising the LID label; a Length Notation Type portion comprising the measure type of the protected part; a Length of the Protected Part portion comprising the length of the protected part; and a Bit Error Ratio portion comprising the maximum allowed bit error ratio for the said protected part.

The descriptor information may comprise Truncation Preference that comprises the following portions: a Label portion comprising the LID label; a Length Notation Type portion comprising the measure type of the protected part; a Significant portion comprising whether the carried payload of a packet is important for the decoding process; a Truncation Option portion comprising detailed information on enhanced packet truncation options; and a Truncation Point portion comprising the explicit truncation points of the payload.

The descriptor information may comprise Bandwidth Partitioning that comprises the following portions: a Label portion comprising the LID label; a Unit portion comprising measure unit of the required bandwidth; and a Bandwidth portion comprising the measured amount of bandwidth in the said measure unit.

The descriptor information may comprise the following portions: a Traffic Class portion; a Procedure Indicator portion; a Rate Adaptation Method portion; a Delivery of Erroneous Media Frames portion; and a Number of Labels portion; for example as illustrated in FIG. 11 or 19 of the accompanying drawings.

The descriptor information may comprise the following portions: a Label From portion; a Label To portion; and a Code Point portion; for example as illustrated in FIG. 12 or 20 of the accompanying drawings.

The descriptor information may comprise the following portions: a Label portion; a Significant portion; a Frame Type portion; and a Drop Preference portion; for example as illustrated in FIG. 13 or 21 of the accompanying drawings.

The descriptor information may comprise the following portions: a Label portion; a Length Notation Type portion; a Length of the Protected Part portion; and a Bit Error Ratio portion; for example as illustrated in FIG. 14 or 22 of the accompanying drawings.

The descriptor information may comprise the following portions: a Label portion; a Length Notation Type portion; a Significant portion; a Truncation Option portion; and a Truncation Point portion; for example as illustrated in FIG. 15 or 23 of the accompanying drawings.

The descriptor information may comprise the following portions: a Label portion; a Unit portion; and a Bandwidth portion; for example as illustrated in FIG. 16 or 24 of the accompanying drawings.

According to a second aspect of the present invention there is provided a method of distributing descriptor information in a packet switched network, the descriptor information relating to options for stream adaptation in the packet switched network, comprising using a method according to the first aspect of the present invention to distribute the descriptor information.

The information may relate to options for media stream adaptation in the packet switched network.

According to a third aspect of the present invention there is provided a signal carrying descriptor information in a packet switched network, the descriptor information relating to options for stream adaptation in the packet switched network, wherein the signal comprises one of a NSIS and a RSVP signalling protocol signal.

The signal may be a NSIS signalling protocol signal.

The signal may be a RSVP signalling protocol signal.

According to a fourth aspect of the present invention there is provided an apparatus for use in a packet switched network, comprising means for carrying descriptor information relating to options for stream adaptation in the packet switched network using at least one of the Next Step in Signalling, NSIS, and Resource Reservation Protocol, RSVP, signalling protocols.

According to a fifth aspect of the present invention there is provided an apparatus adapted to carry a signal according to the third aspect of the present invention.

The apparatus may comprise a QoS NSIS Entity, QNE.

The QNE may comprise a QoS NSIS Initiator, QNI.

The QNE may comprise a QoS NSIS Receiver, QNR.

The apparatus may comprise a RSVP Router.

The RSVP Router may comprise a descriptor information broker function.

The apparatus may comprise a RSVP Host.

The RSVP Host may comprise a user preferences and terminal capability function.

The RSVP Host may comprise a codec and third party settings function.

The carrying means may comprise at least one of: means for receiving the descriptor information; means for processing the descriptor information; means for generating the descriptor information; means for distributing the descriptor information; means for transmitting the descriptor information; and means for using the descriptor information in any way.

According to a sixth aspect of the present invention there is provided a program for controlling an apparatus to perform a method according to the first or second aspect of the present invention or which, when loaded into an apparatus, causes the apparatus to become an apparatus according to the fourth or fifth aspect of the present invention. The program may be carried on a carrier medium. The carrier medium may be a storage medium. The carrier medium may be a transmission medium.

According to a seventh aspect of the present invention there is provided an apparatus programmed by a program according to the third aspect of the present invention.

According to an eighth aspect of the present invention there is provided a storage medium containing a program according to the third aspect of the present invention.

An embodiment of the present invention offers one or more of the following advantages:

The proposed solution provides a framework to distribute general cross-layer information.

The proposed framework is an extension of RSVP/NSIS. That is the solution could have great influence on practice.

The proposed solution can be deployed at key network elements like media gateways and network border routers. Such network elements should only be aware of the proposed extensions.

The proposed solution has low complexity and can be implemented in a simple way.

The RSVP and NSIS signalling transport protocol mechanism provide a general facility for creating and maintaining distributed QoS reservation states along the delivery paths.

The proposed solution does not need own security solutions. The concept allows distributing and applying cross-layer information within the security context of NSIS and RSVP.

BRIEF DESCRIPTION OF THE DRAWINGS

FIG. 19 illustrates a LID Traffic Class Object;

FIG. 20 illustrates a Label to Code Point Converter Object;

FIG. 21 illustrates a Packet Drop Preference Object;

FIG. 24 illustrates a Bandwidth Partitioning Object.

DETAILED DESCRIPTION

Figure 1:
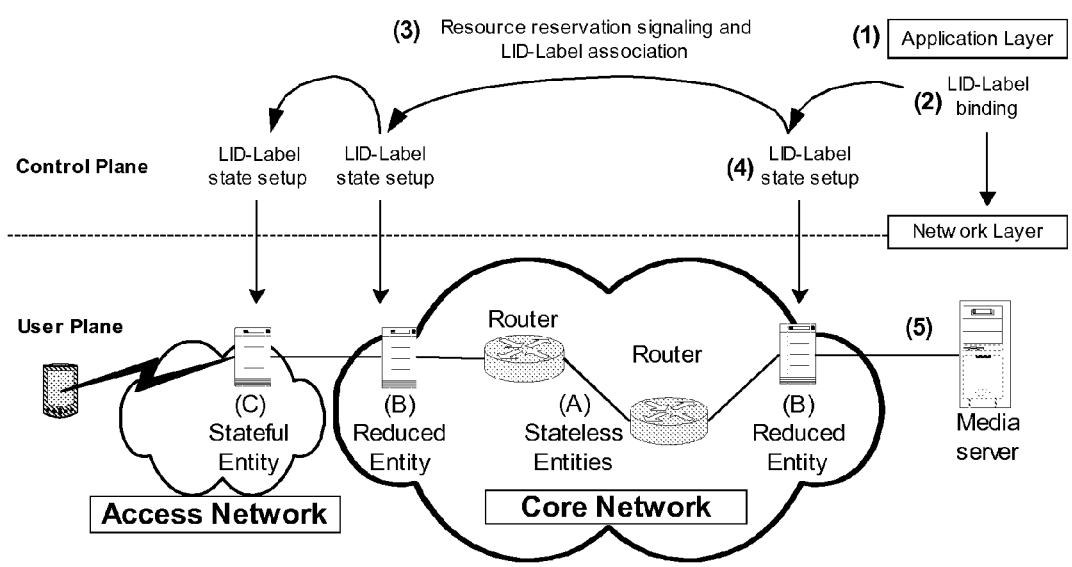
FIG. 1 illustrates a basic LID-label setup signalling method.

Within the context as set out previously, the applicant has identified a desirability to provide a generally applicable solution for cross-layer information forwarding. Cross-layer information can significantly improve the performance of, e.g. media delivery in terms of the user-perceived quality. Signalling cross-layer information between two networking nodes needs Information Forwarding (IF). QoS signalling requiring support from all routers along the delivery path can be served by Next Step in Signalling (NSIS) or Resource Reservation Protocol (RSVP) [P. Sarolahti, S. Floyd, "*Cross-layer Indications for Transport Protocols*" IEEE Internet Draft, October 2006].

The applicant has further identified a desirability to provide a solution as to how IF can be integrated as a General Cross-layer Information Forwarding (GCIF) method into existing signalling protocols such as NSIS and RSVP. Since RSVP is for both unicast and multicast, the proposed signalling extension can provide cross-layer information for media delivery. Currently, NSIS can be applied to unicast signalling only. However, the proposed extensions to NSIS can support multicast signalling as well. Accessing cross-layer information can be done by e.g. Local Profiles. In this case, cross-layer information is stored in local databases within the routers, gateways, media aware network elements, etc. To store and access the signalled information Local Profiles are used, but other suitable method can be supplied as well.

By introducing cross-layer IF in order to provide Quality of Service (QoS), feasibility and applicability of the concept must be considered. The main criteria identified are the following. (i) Small and scalable description size of the forwarded information, (ii) generic description and (iii) low complexity.

Based on the forwarded information, the different network segments can autonomously optimize their performance. Moreover, cross-layer IF signalling can reduce the need of frequent feedback signalling in general, although it requires increased node complexity. However, in heterogeneous networks, end-to-end schemes may hide the underlying diverse transport characteristics which may result in suboptimal performance.

In the case of multimedia transmission, for example, the user perceived quality can be kept as good as current network load and local transmission conditions allow. That is, the network elements should be capable to perform the selected QoS action. By gathering the cross-layer information, network elements can apply the selected actions to individual data packets [A. Takács, F. Kalleitner, "Multimedia Transport Optimization through Forward Information Signalling", PCT/EP2005/009387, August 2005, published as WO 2007/025560]. An application example is demonstrated of the GCIF container object for NSIS/RSVP to support general media descriptor such as Layer Independent Descriptor (LID).

Before a description of an embodiment of the present invention, some further background information will now be provided; this information will be of use in understanding the later-described embodiment of the present invention.

A GCIF container collects the cross-layer information to be forwarded and distributed throughout the network. The format of GCIF descriptor is independent of the proposed signalling method (NSIS or RSVP). For multimedia, the GCIF can be the Layer Independent Descriptor (LID), as it is described in reference [A. Takács, F. Kalleitner, "Multimedia Transport Optimization through Forward Information Signalling", PCT/EP2005/009387, August 2005, published as WO 2007/025560]. In order to keep the IF description simple, a general Extensible Markup Language (XML) based format can be used.

The Layer Independent Descriptor (LID) is a general (codec independent) packet level adaptation descriptor, a possible realization of GCIF for multimedia adaptation [A. Takács, F. Kalleitner, "Multimedia Transport Optimization through Forward Information Signalling", PCT/EP2005/009387, August 2005, published as WO 2007/025560]. The typical applications of LID include Rate Adaptation (RA), Unequal Error Protection (UEP) and Bandwidth Reservation (BR). Scalable media streams may require establishment of LID-states, additionally to regular QoS Signalling states. The required states for the adaptation can be stored only in key network elements in order to increase efficiency of the solution. LID-label binding is applied to reduce the overhead of the packets.

An overview of LID distribution and signalling will now be provided with reference to FIG. 1, which shows the basic LID-label setup signalling method having four main steps:

1. The source constructs the necessary set of LIDs based on the adaptation features.
2. A unique Label must be associated with the constructed LIDs.
3. The LID-Label binding must be distributed to the key network elements, e.g. in GCIF containers.
4. Network elements aware of the LID install the necessary states per a single or aggregated flow.
5. The sender application has to assign the appropriate Label per packet during transmission.

The signalling concept is independent of the underlying transport network. The LID-Label binding process reduces the signalling overhead. The proper operation may require to update the LID status, which update is supported by NSIS and RSVP as well.

The Resource Reservation Protocol (RSVP) [R. Braden, L. Zhang, S. Berson, S. Herzog, S. Jamin, "*Resource Reservation Protocol (RSVP)*", IEEE RFC 2205, September 1997] is a resource reservation protocol designed to guarantee QoS for real-time and streaming traffic. The protocol is used to request specific service quality from the transport network, thus RSVP was created in a receiver driven concept, where the receiving host initiates the QoS request. This approach is well suitable for multicast communication. It is assumed that the receivers have exact knowledge of the existing sender hosts. RSVP can handle only uni-directional reservations and treats the sender as a logically distinct entity from the receiver, although they share the same media-session in the same time. Also note that RSVP itself is not a routing protocol, thus RSVP was designed to co-operate with any existing or future routing protocols. RSVP was only considered with the QoS of those packets that are forwarded by the actually used routing protocol.

Next Step In Signalling (NSIS) [R. Hancock, G. Karagiannis, J. Loughney, S. Van den Bosch, "*Next Steps in Signalling (NSIS): Framework*", IEEE RFC 4080, June 2005] is an active working group of the Internet Engineering Task Force (IETF), targeting the specification of a general signalling protocol for resource reservation as a cardinal use case. NSIS aims to overcome the scalability problems of RSVP while focusing on flexibility. Briefly, the underlying signalling transport, the NSIS Transport Layer Protocol (NTLP) is a generic transport framework. According to the requirements of the NSIS framework, the NSIS Signalling Layer Protocol (NSLP) must be opaque to the NTLP, thus it is not necessary to place any requirements for the distribution of GCIF. The deployment of GCIF requires an extension of the QoS-NSLP.

An aim of the invention is to provide a generally applicable solution for cross-layer information forwarding and a realization of the general solution that uses the LID as the forwarded information. An embodiment of the present invention aims to provide a solution how a General Cross-layer Information Forwarding (GCIF) method can be integrated into existing signalling protocols such as NSIS and RSVP. An embodiment of the present invention also proposes specific NSIS and RSVP object formats [P. Sarolahti, S. Floyd, "*Cross-layer Indications for Transport Protocols*" IEEE Internet Draft, October 2006] for GCIF supporting the LID. The proposed solution uses local profiles to store and access the signalled information within the network nodes. However, local profiles can be changed to any applicable technique.

A signalling extension to RSVP and NSIS is proposed to support GCIF.

For supporting any GCIF object in NSIS, three possible solutions are proposed: (A1) New GCIF-QOSM; (A2) New QSPEC QoS object; and (A3) New optional QSPEC parameters. Herein, QOSM and QSPEC are abbreviations for "QoS-NSLP QoS Model" and "QoS Specification" respectively.

For supporting any GCIF object in RSVP, it is proposed to extend the PATH message of RSVP.

A solution is also proposed as to how to extend the RSVP Router and Host functionalities to support GCIF.

New functionalities are also proposed for LID as compared to what is disclosed in reference [A. Takács, F. Kalleitner, "Multimedia Transport Optimization through Forward Information Signalling", PCT/EP2005/009387, August 2005, published as WO 2007/025560]: (a) Label to Code Point Converter; and (b) Bandwidth Partitioning.

Possible message formats are also proposed for LID parameters in NSIS and RSVP.

These various proposals will now be discussed in more detail.

(A) NSIS Supporting General Cross-Layer Information Forwarding

Figure 2:
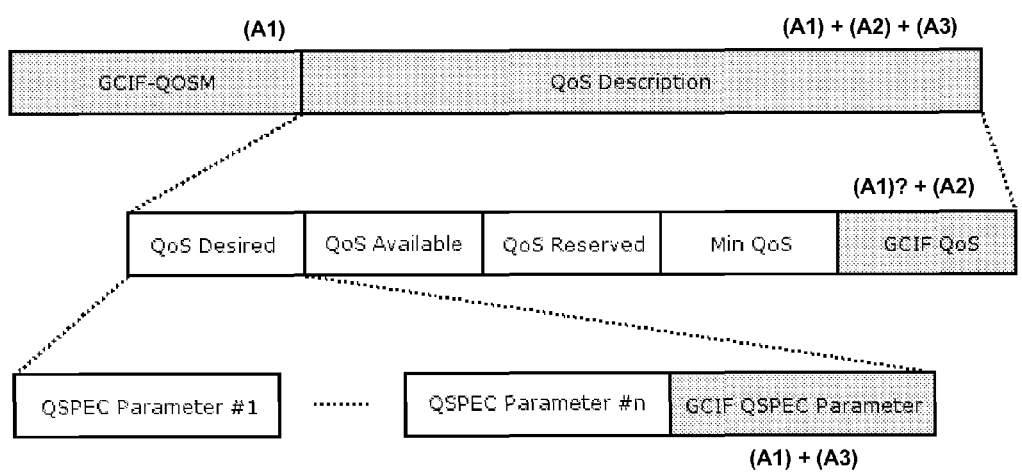
FIG. 2 illustrates possible NSIS extensions for supporting LID.

Three possible options are proposed to support GCIF by the NSIS framework: (A1) Create a new QOSM supporting the GCIF container; (A2) Create a new QSPEC object for existing QOSMs; and (A3) Create a new optional QSPEC parameter for existing QSPEC objects. These three possibilities are shown in grey in FIG. 2.

These three options will now be described in more detail.
(A1) Create a New QOSM Supporting the GCIF Container (GCIF-QOSM)

If a new QOSM is defined for supporting the GCIF container, then the QoS NSIS Entities (QNEs) know what parameters are awaited and how to interpret these parameters. The following description is based on the compulsory QOSM specifications listed in reference [G. Ash, A. Bader, C. Kappler, D. Oran, "*QoS NSLP QSPEC Template*", IEEE Internet Draft, December, 2006].

QNEs supporting GCIF-QOSM can be any key network elements, or can be any node, according to the density of use of the forwarded information. The role of these QNEs is to process and store the received GCIF information, i.e., creating GCIF-states in a given QNE. GCIF-states are soft states and may be refreshed upon request.

The GCIF related QSPEC parameters of GCIF-QOSM can be carried, for example, in the QoS Desired QSPEC object, or in any other proper object as well. Mandatory QSPEC parameters of the QoS Desired object can be any of the subset of the parameters defined by the NSIS working Group. If the only goal is to distribute the GCIF container and let it pass all the QNEs without rejection, these parameters should be set to the possible minimum values (for example 0 for traffic sub-parameter, indicating no bandwidth reservation is required) in order to let them pass by all QNEs along the signalling path. If the common NSIS features should be used as well, then the mandatory and optional QSPEC parameters should be filled in according to the desired QoS. We propose that the information of the GCIF container is carried in optional QSPEC parameter(s).

Encapsulation of GCIF Container

Figure 3:
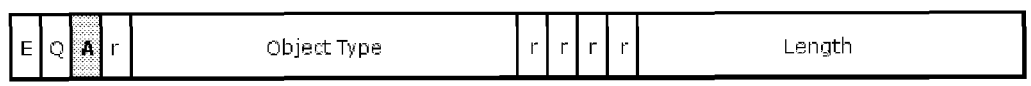
FIG. 3 illustrates a QSPEC object header extension.

The optional QSPEC parameter(s) carrying the GCIF container must be interpreted at least by the QoS NSIS Initiator (QNI) and QoS NSIS Receiver (QNR). In order to get other QNEs along the signalling path to set GCIF-states, the defined optional QSPEC GCIF parameters must be known and should be interpreted by these QNEs. Optional GCIF QSPEC information received by the QNEs is a trigger to set or refresh the GCIF-states maintained in the given nodes. QNEs not supporting a given optional GCIF QSPEC parameter set the appropriate flag of the parameter header. This indicates the QNI that (at least) one node on the signalling path could not interpret the parameter. Regardless to this flag, the QNI can decide to accept the distribution procedure. However, the corresponding flag will be set (equal to 1) even if none of the QNEs has accepted the GCIF QSPEC parameter(s). In order to avoid this, a flag (A) should be added to the QSPEC object header indicating that at least one QNE has accepted the QSPEC GCIF parameters. Both the header of QoS Desired and QoS Available objects has to be extended by the proposed A flag. The format of the extended header information is depicted in FIG. 3. Note, that FIG. 3 is only an illustration. The indicated flags can be changed by NSIS Working Group as well as the position of the A flag can be at any other proper place in the header. Also note, that the existence of the A flag has no effect on the specified interpretation of QoS objects defined by the NSIS working group.

If strict interpretation of optional QSPEC GCIF parameters is not possible, then remapping of these parameters is required. Remapping should be considered in particular implementations of the optional QSPEC GCIF parameters.
Distribution of GCIF Container The GCIF container can be carried either in a RESERVE or in a QUERY message. In both cases, the QNR responses with the appropriate QoS object (this can be a QoS Reserved or a QoS Available object based on the particular reserve/query message) in a RESPONSE message. If only the distribution of GCIF information is needed, QUERY message can be used or the RESERVE message with the above described restrictions to mandatory QSPEC parameters. If reservations should be done as well, then the RESERVE message should include the appropriate mandatory QSPEC parameters. The message flow of GCIF-QOSM and GCIF state establishment can be seen in FIG. 4.

Figure 4:
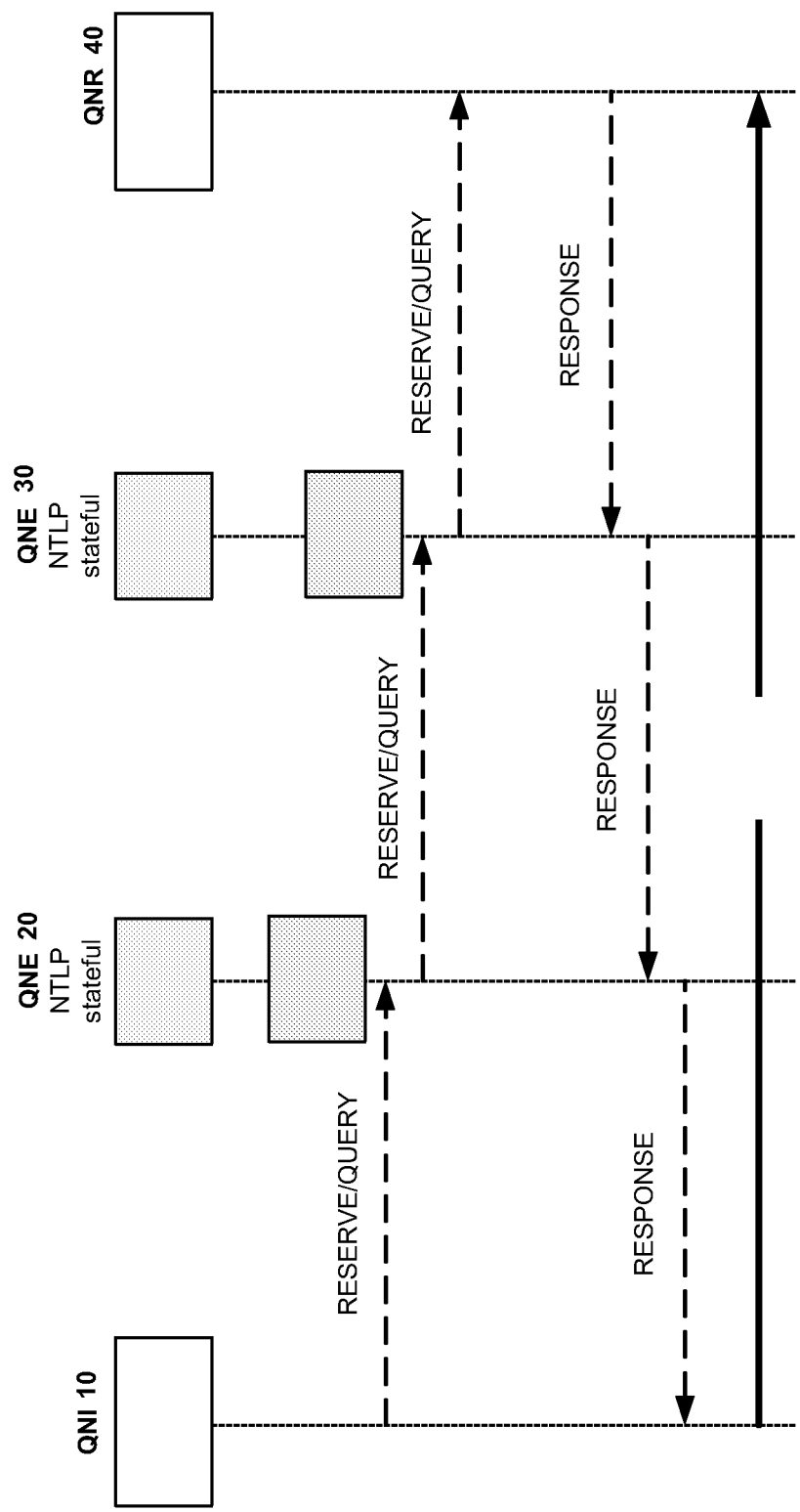
FIG. 4 illustrates a message flow and state establishment for GCIF-QOSM.

FIG. 4 illustrates a QNI 10, first and second QNEs 20 and 30, and a QNR 40. The QNI 10 acts as the initiator of the GCIF-QOSM, sending the GCIF-QOSM in a RESERVE/QUERY message (or signal) to the first QNE 20 for processing to extract the GCIF state, with the RESERVE/QUERY message being sent onward to the second QNE 30 for processing to extract the GCIF state. The RESERVE/QUERY message finally reaches the QNR 40, and a RESPONSE message is sent back to the QNI 10 via the first and second QNEs 20 and 30.

It is to be noted that the ID of GCIF-QOSM is assigned by an Internet Assigned Names Authority (IRNA).

It is also to be noted that, in order to be compatible, the new QOSM would include all mandatory parameters of existing QOSMs and may include any subset of the known optional parameters.

Figure 5:
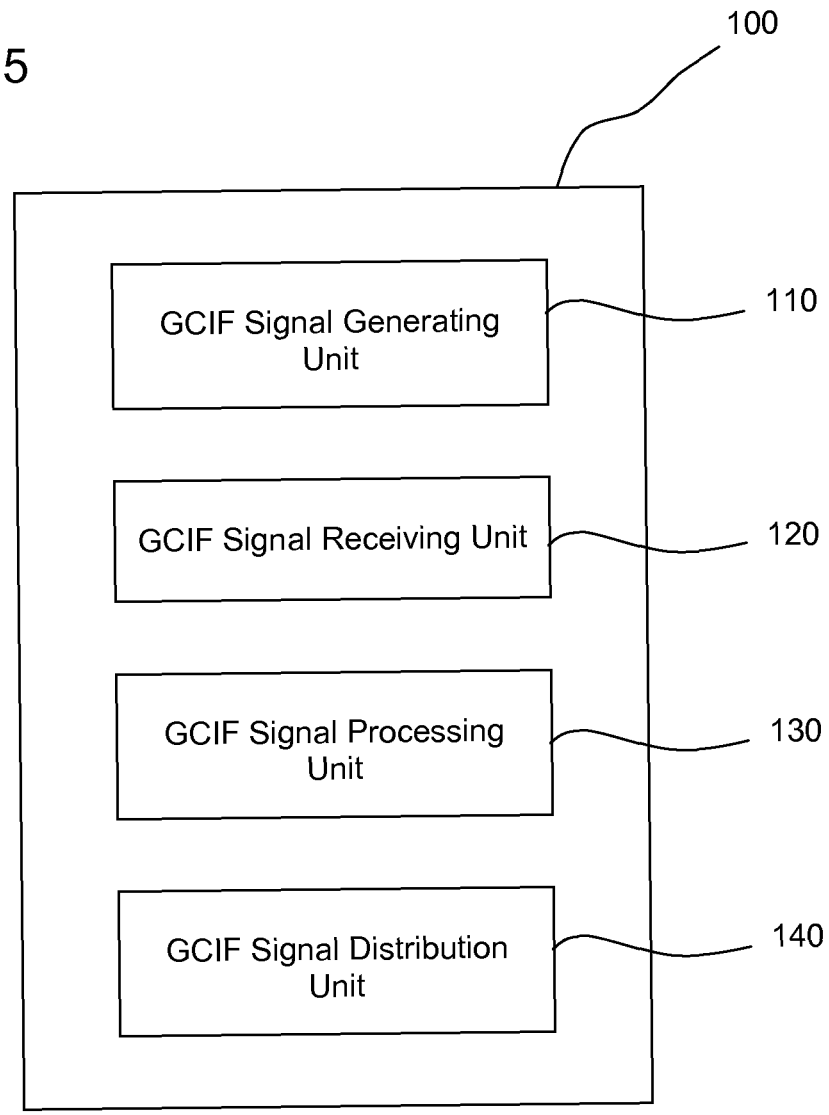
FIG. 5 is a schematic illustration of a node apparatus embodying the present invention.

Generalised node apparatus embodying the present invention is illustrated schematically in FIG. 5. Node apparatus 100 comprises a GCIF Signal Generating Unit 110, a GCIF Signal Receiving Unit 120, a GCIF Signal Processing Unit 130 and a GCIF Signal Distribution Unit 140, although a node need not have all of these components. For example, the QNI 10 of FIG. 4 might have the GCIF Signal Generating Unit 110 and the GCIF Signal Distribution Unit 140, while the QNEs 20, 30 of FIG. 4 might have the GCIF Signal Receiving Unit 120, the GCIF Signal Processing Unit 130 and the GCIF Signal Distribution Unit 140, and the QNR 40 of FIG. 4 might have the GCIF Signal Receiving Unit 120 and the GCIF Signal Processing Unit 130.

Figure 6:
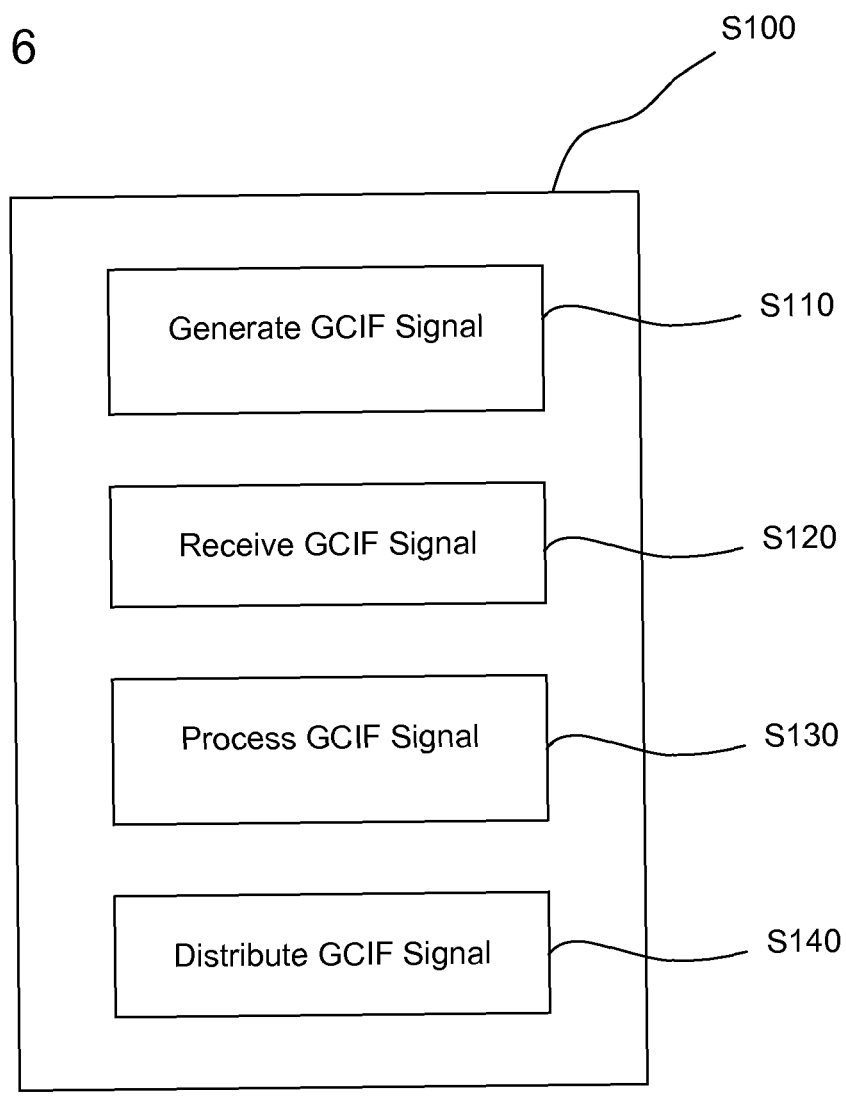
FIG. 6 is a schematic illustration of the method steps performed by the node apparatus of FIG. 5.

Each component of the node 100 of FIG. 5 can be considered to perform a corresponding function or method as appropriate, and this is illustrated schematically in FIG. 6. As illustrated, a GCIF Signal Generating Step S110, a GCIF Signal Receiving Step S120, a GCIF Signal Processing Step S130 and a GCIF Signal Distribution Step S140 are performed respectively by the GCIF Signal Generating Unit 110, the GCIF Signal Receiving Unit 120, the GCIF Signal Processing Unit 130 and the GCIF Signal Distribution Unit 140.

It is to be understood that the illustrated node apparatus 100 applies generally to other embodiments of the invention described herein in corresponding fashion.

(A2) Create a New QSPEC Object for Existing QOSMs (GCIF QoS)

The new GCIF related QSPEC object (GCIF QoS) defined for existing QOSMs would be an optional object, like Minimum QoS is. That is, the GCIF QoS may be supported by QNEs. The GCIF QoS header shares the common header format of QoS objects. However, the functionality of indicating at least one successful setup of the GCIF-states requires the proposed extension of the header format shown in FIG. 3. The value of the Object Type field should be assigned by IRNA.

The QSPEC parameters for GCIF QoS Object can be mandatory or optional parameters. Constraints for parameter settings and usage are described above in the section entitled "Encapsulation of GCIF Container".

The advantage of defining a new QSPEC object for existing QOSMs is the ease of deployment. It can be used with any of the existing or future QOSMs. However, the new QSPEC object has to be accepted and drafted by the NSIS working group as well as a new QOSM.

(A3) Create a New Optional QSPEC Parameter for Existing QSPEC Objects

The GCIF container can be carried in standalone optional QSPEC parameters as well. For detailed description, see the section above entitled "Encapsulation of GCIF Container". The proposed A-flag can also be added to the optional QSPEC parameter header replacing a reserved (r) bit there. This gives the opportunity for the QNI to check which particular parameters cannot be interpreted at all. In this case, the A flag of the object header is not mandatory anymore. Note, that the impact on current NSIS specification is the least for this option of signalling GCIF information with NSIS.

(B) RSVP Supporting General Cross-Layer Information Forwarding (B1) Signalling Extensions—Signalling of General Cross-Layer Information The RSVP protocol mechanisms provide a general facility for creating and maintaining distributed reservation state along the delivery paths. This flexibility is used to distribute the GCIF. See FIG. 7 for an illustration.

Figure 7:
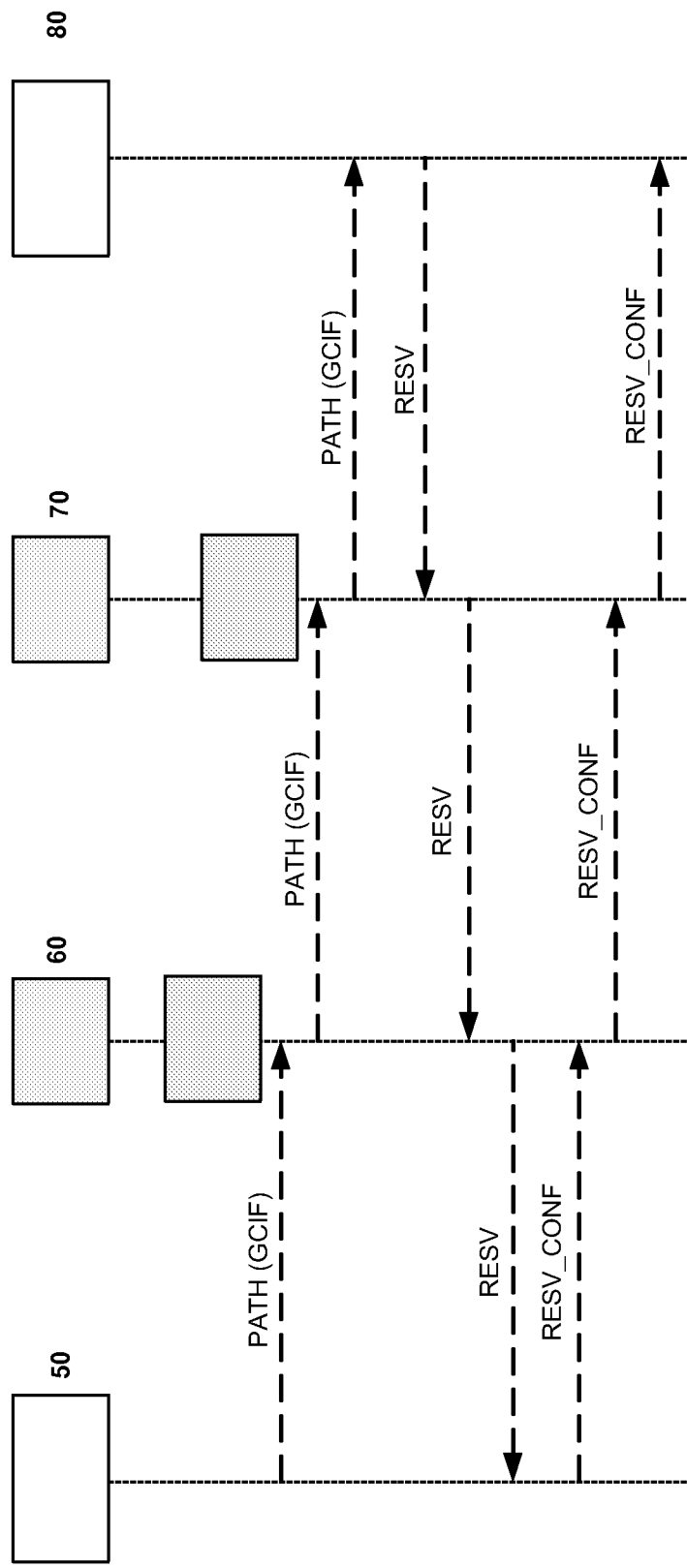
FIG. 7 illustrates a RSVP End-to-End Signalling Supporting LID Distribution.

FIG. 7 illustrates a Media Server 50, first and second RSVP Routers 60 and 70, and a Receiver 80. The Media Server 50 acts as the initiator of the GCIF, sending the GCIF in a PATH message (or signal) to the first RSVP Router 60 for processing to extract the GCIF state, with the PATH message being sent onward to the second RSVP Router 70 for processing to extract the GCIF state. The PATH message finally reaches the Receiver 80, and a RESV message is sent back to the Media Server 50 via the first and second RSVP Routers 60 and 70. Finally, the Media Server 50 responds with a RESV_CONF message that reaches the Receiver 80 via first and second RSVP Routers 60 and 70.

Therefore, as illustrated in FIG. 7, the PATH message could carry the GCIF information, because this message is generated by the sender node. On the other hand, RSVP was designed to co-operate with present and future QoS-based services, thus object extensions can be defined and they are opaque for the RSVP protocol itself by definition.

Beside the registration and path selection information (e.g. the address of the previous hop), the PATH message optionally contains the descriptor of the sender. This descriptor could host the GCIF information in one of its objects. There are three predefined objects in the sender descriptor.

SENDER-TEMPLATE: This object describes the format of the data packets sent by the sender.

SENDER-TSPEC: This object describes the traffic characteristic of the data flow that the sender will generate. Thereby, this information can be used for traffic and admission control.

ADSPEC: This objects carries the On Path With Advertising (OPWA) information including delay and bandwidth estimates and other QoS related information calculated by the local traffic control functions and represented as a summary as heading along the path.

The GCIF processing engine is either integrated or running in parallel to the RSVP process. This process may gain from the information carried by the SENDER-TSPEC and ADSPEC objects to gather information that the receivers can use to predict the end-to-end service.

In summary, two options can be envisaged to place the GCIF in the RSVP PATH message. First is the extension of the SENDER-TSPEC object by a GCIF header. A reserved bit could be used to indicate the presence of the GCIF extension header. Second is to extend the sender descriptor by an optional GCIF object. The extension of the sender descriptor potentially has less impact on interoperability compared to the first method, and is therefore considered to be the preferable option.

It is to be noted that the settings of the ADSPEC might be updated by the network elements on the downstream path. Hence, ADSPEC is not an appropriate object to distribute GCIF.

Figure 8:
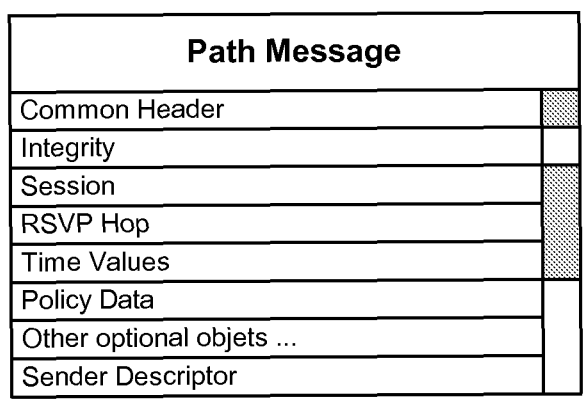
FIG. 8 illustrates the RSVP Path Message.
Figure 9:
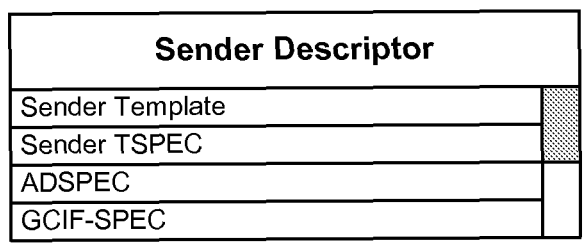
FIG. 9 illustrates the Sender Descriptor Object.

The format of a standard PATH message is shown in FIG. 8. The PATH message can be extended by an optional Sender Descriptor object containing the GCIF object. This object is referred to as GCIF-SPEC object. The proposed Sender Descriptor is illustrated in FIG. 9.

(B2) Extensions in RSVP Hosts and RSVP Routers

Figure 10:
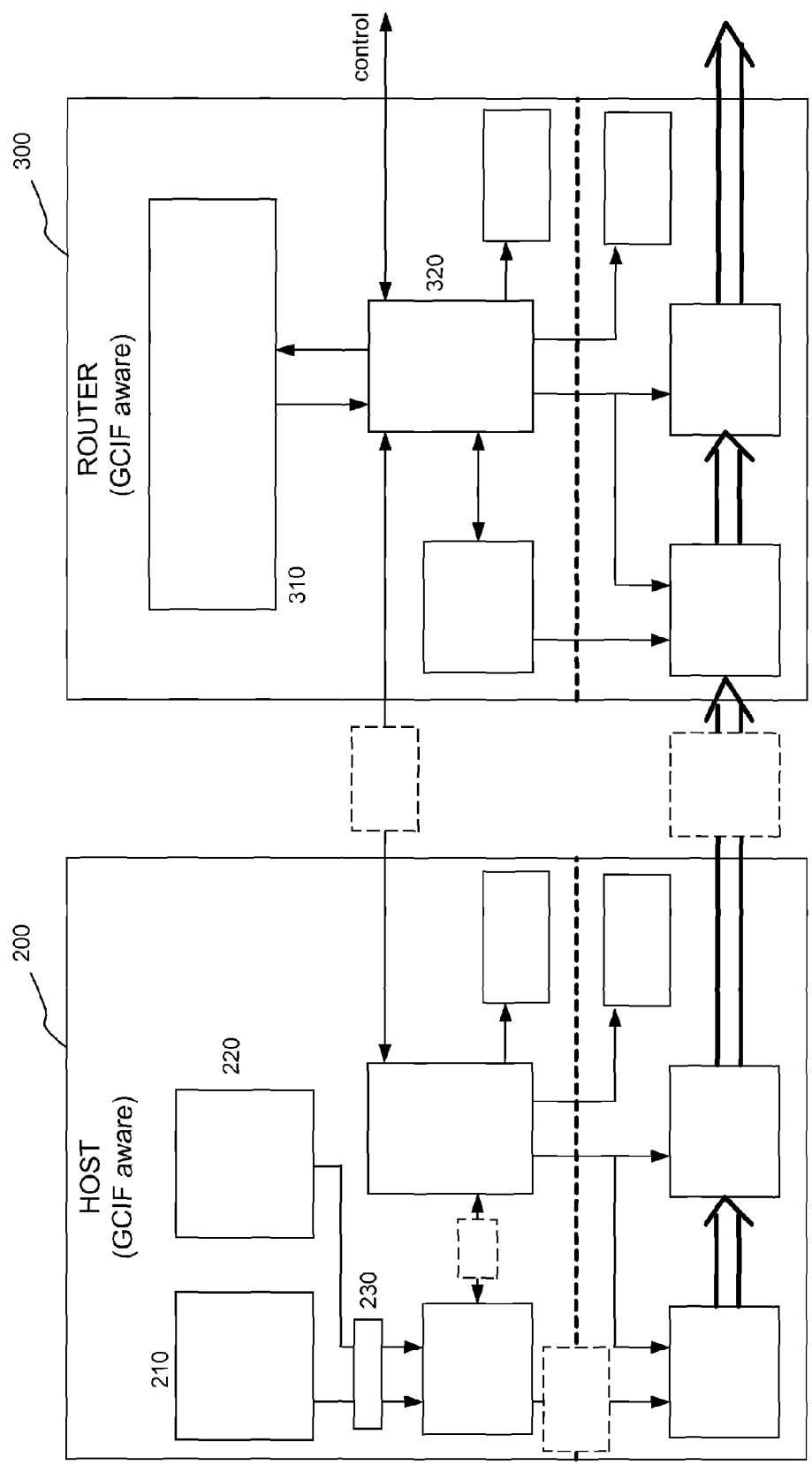
FIG. 10 illustrates an extension in RSVP Host and RSVP Router.

FIG. 5, described above, illustrates a generalised node apparatus that is appropriate also to this embodiment of the present invention. FIG. 10 shows in more detail the points where the regular RSVP implementation needs to be modified in order to handle the GCIF information. This input has influence on the negotiation process between the communication peers. In addition a new interface can be used to provide a controlling option to 3rd party's e.g. content provider(s). In this context, network operator and content provider may announce themselves as 3rd party applications. The received settings from different interfaces need to be merged by the application. The standard RSVP reservation setup is not affected by the GCIF extension, only the RSVP protocol engine has to consider the GCIF data while generating the RSVP PATH message before transmission.

It can be seen from FIG. 10 that a GCIF aware Host 210 has various standard components that will not be described here, and differs from a standard host by having a User Preferences & Terminal Capability 210 and Codec & Third Party Settings 220 that are input to the Multimedia Content Description Interface (MDCI) component 230. A GCIF aware Router 300 has various standard components that will not be described here, and differs from a standard router by having a GCIF Information Broker 310 interfacing with the RSVP process 320 on the Router 300.

(C) The Description of the Layer Independent Descriptor

In order to provide improved multimedia delivery, the Layer Independent Descriptor (LID) can be used and distributed as GCIF. The LID framework contains six descriptors. The core LID functionality is covered by the following four descriptors: (i) LID Traffic Class, (ii) Packet Drop Preference, (iii) Protection Preference and (iv) Truncation Preference. Two further descriptors are used for enhanced cross-layer control to enable an opaque and efficient interwork with other network domains in the means of QoS: (v) LID-Label to Code Point Converter and (vi) Bandwidth Partitioning.

(C1) LID Traffic Class

In order to specify a scalable media (data) stream, this descriptor consists of general attributes only, without providing details about Drop-, Protection- and Truncation Information. There are four different QoS classes: conversational, streaming, interactive and background class. The delay sensitivity is the main distinguishing factor between these QoS classes. In practice, the Conversational class is meant for traffic which is very delay sensitive while Background class is the most delay insensitive traffic class. For both classes, robustness to packet loss is assumed. Practically, conversational and streaming services are used to carry real-time traffic flows.

(C2) LID-Label to Code Point Converter

The LID-Label to Code Point Converter (L2-CPC) is necessary to fulfill two requirements. First, almost all QoS Signalling protocols (like RSVP and NSIS) can differentiate the importance of media and data sessions only on stream level. However, the concept of local stream adaptation requires an importance differentiation on packet level. These packets may belong to a single media stream or to different media streams. Second, due to the increasing heterogeneity of transport networks, it is most likely that the data path traverses different network domains, enclosing a number of different QoS architectures and QoS models. Concerned domains may support different QoS classification, so called Code Point or a set of Code Points or interpret assigned Code Points differently. The latter is rather common at network borders (edge routers) without a Service Level Agreement (SLA) between operators. These Code Points could be for example the DiffServ Code Points (DSCPs), where DiffServ is short for "Differentiated Services". The fields of application for the L2-CPC cover any type of adaptive multimedia stream.

(C3) LID Preferences

The LID Preferences consists of three sub-preferences: Packet Drop Preference, Truncation Preference and Protection Preference.

Packet Drop Preference

The drop preference can be specified for each packet and can be used to optimize resources for a particular network link and to resolve congestion by local stream adaptation. In practice, intelligent packet drop can be the most suitable method for Unequal Error Protection (UEP) and Rate Adaptation (RA).

Protection Preference

For sophisticated error protection, the Protection Preference can be used. The descriptor specifies the protection level and the structure of the packet. Protection Preference is used to apply packet-level UEP.

Truncation Preference

Compared to packet drop, packet truncation allows rate adaptation in a more sophisticated way. To exploit packet truncation, media packets must carry Fine Granular Scalability (FGS) data [H. Schwarz, D. Marpe, T. Wiegand, "*Overview of the Scalable H.264/MPEG4-AVC Extension*", *IEEE ICIP* '06, October, 2006]. The truncation points are indicated by offsets or relative truncation (relative truncation is not advantageous if the size of the packets is small) points. Packet truncation is an option for RA and UEP. In general the packet length of a (compressed) voice media stream is short, thus a specification on bit level is required. On the other hand, the packet length of a video media stream rather huge (several kilobyte), thus a specification on byte level is required. If the link layer supports flexible transmission (and in case of a variable length packet stream), a percentage notation is recommended.

It is not always advantageous to map all characteristics of a stream to the LID, for example, (i) if the length of enhancement layers is very small or (ii) if the number of layers is high. These properties are quite typical for speech/audio codecs (see, e.g. Scalable Speech Audio Codec (SSAC) [ITU-T Studygroup 16, "*Terms of Reference for Embedded VBR (EV) speech codec standardization*", (Draft v4.3+revisions of 2. Aug. 2005), Annex Q09.A in TD 167 R1 (PLEN/16)]) and valid for FGS video codecs (such as H.264/SVC). In these cases, the enhancement information is better to be considered as one large enhancement layer that can be truncated at any point.

(C4) Bandwidth Partitioning

Bandwidth Partitioning contains the bandwidth request per layer, which is advantageous in case of layered media and provides an option for BR. Based on this information, the Call Admission Control (CAC) can decide how many layers can be admitted in the network and the bandwidth reservation can be done based on the corresponding decision.

(D) NSIS Support for the Layer Independent Descriptor

The Layer Independent Descriptor (LID) is a particular type of GCIF information used for media stream description and adaptation. The methods, how NSIS can support such GCIF information is described previously in the section above entitled "NSIS Supporting General Cross-layer Information Forwarding". Any of the proposed solutions is used the LID specific optional QSPEC parameters can be used without any changes. In the followings it is shown how the proposed LID parameters (see the section above entitled "The Description of the Layer Independent Descriptor") can be mapped to NSIS optional QSPEC parameters.

(D1) NSIS optional QSPEC Parameters for the Layer Independent Descriptor

The proposed LID optional QSPEC parameters must share the common header format for optional QSPEC parameters as it is defined in reference [G. Ash, A. Bader, C. Kappler, D. Oran, "*QoS NSLP QSPEC Template*", *IEEE Internet Draft*, December, 2006]. In current NSIS specification the M flag of the header (first bit) must be 0, indicating that the parameter is an optional QSPEC parameter. Parameter IDs must be assigned by IRNA.

Any subset of the described LID optional QSPEC parameters can be carried in a given NSIS QoS object. The process in a given QNE that sets the LID-state must signal the NSIS entity that an important LID parameter is missing form the optional QSPEC list. This should trigger and force a NSIS reservation failure notification to the QNI within the appropriate QSPEC QoS object. This procedure is required, because the NSIS reservation can be successful although an optional QSPEC parameter could not be interpreted in any of the QNEs along the signalling path.

Note, that the header format of NSIS QSPEC parameters is depicted according to the current specifications given by reference [G. Ash, A. Bader, C. Kappler, D. Oran, "*QoS NSLP QSPEC Template*", IEEE Internet Draft, December, 2006]. Later any changes can be done in the format, but this fact does not have affect on the proposed mappings.

Also note, that the attribute coding is only a proposal as well, and does not affect the proposed mapping of LID parameters to optional QSPEC parameters. Other formats of parameter would be readily applicable.

LID Traffic Class

Figure 11:
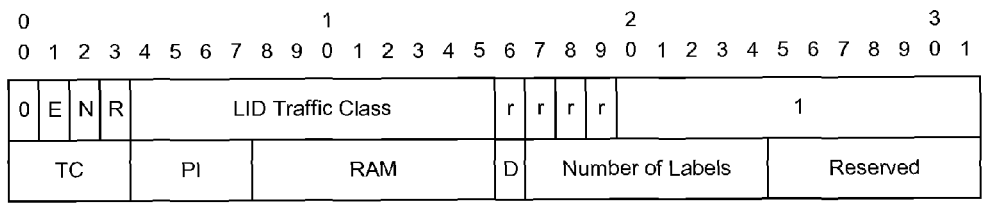
FIG. 11 illustrates a LID Traffic Class optional QSPEC Parameter.

The bit format of the LID Traffic Class optional QSPEC parameter can be seen in FIG. 11.

- Traffic Class (TC): 4 bits. 0=background, 1=interactive, 2=streaming, 3=conversational, 4-15=reserved.
- Procedure Indicator (PI): 4 bits. Procedure Indicator identifies the type of used LID distribution mode. 0=default LID, 1=predefined LID, 2=dynamic LID, 3-15=reserved.
- Rate Adaptation Method (RAM): 8 bits. This field indicates which kind of rate adaptation the payload requires. 0=no rate controllable bearer, 1=scalable bearer, 3=best effort scaling, 4=scalable bearer with truncation option, 5-15=reserved.
- Delivery of Erroneous Media Frames (D): 1 bit. This bit indicates, whether the corrupted media frame should be forwarded or to be dropped immediately. 0=delivery of erroneous media frames, 1=no delivery of erroneous media frames.
- Number of Labels: 8 bits. This field contains the information about the number of valid labels used by the sending application. The number is incremented by one for each pool of protocol descriptors assigned to one particular Label. Zero is not allowed.

Label to Code Point Converter

Figure 12:
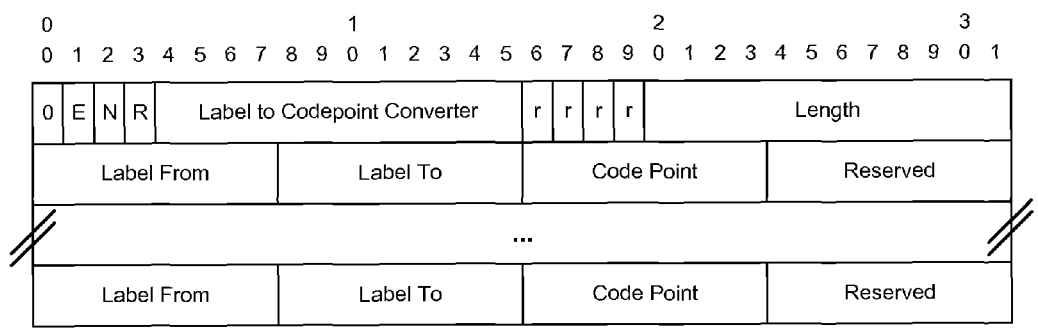
FIG. 12 illustrates a LID Label to Code Point Converter optional QSPEC Parameter.

The bit format of the Label to Code Point Converter optional QSPEC parameter can be seen in FIG. 12.

- Label From: 8 bits. This field contains the corresponding integer value of the Label to be mapped to a certain Code Point. If a range of Labels should be mapped to a single Code Point, then this value marks the starting value of the range of Labels.
- Label To: 8 bits. If a range of Labels should be mapped to a single Code Point, then this value marks the last value of the range of Labels. If a single Label should be mapped to a single Code Point, then Label To=Label From.
- Code Point: 8 bits. Three types of QoS classification methods are considered by QoS-NSLP. One Label or a set of Labels can be mapped to a single Code Point.

Packet Drop Preference

Figure 13:
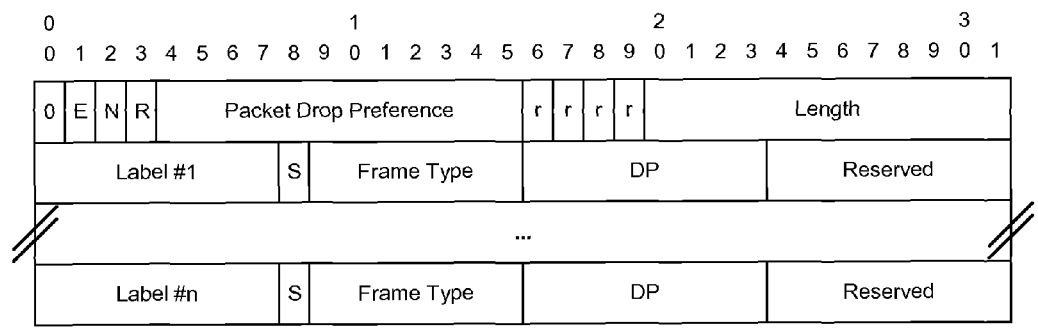
FIG. 13 illustrates a Packet Drop Preference optional QSPEC Parameter.

The bit format of the Packet Drop Preference optional QSPEC parameter can be seen in FIG. 13.

- Label: 8 bits. This field contains the corresponding integer value.
- Significant (S): 1 bit. Indicates if a media frame or a fragment is significant for the decoding process. Setting this bit prevents the packet to be discarded due to e.g., adaptation process. 0=not significant, 1=significant.
- Frame Type: 7 bits. Frame type can give a hint for the adaptation method how to handle each frame or fragments of a frame. 0=Unsigned Frame, 1=Base Frame, 2=Droppable Frame, 3=Truncateable Frame, 4=Best Effort Frame, 5-15=reserved.
- Drop Preference (DP): 8 bits. This field indicates the corresponding importance of the frame. DP assignment is implementation and source codec specific. Zero value is allowed.

Protection Preference

Figure 14:
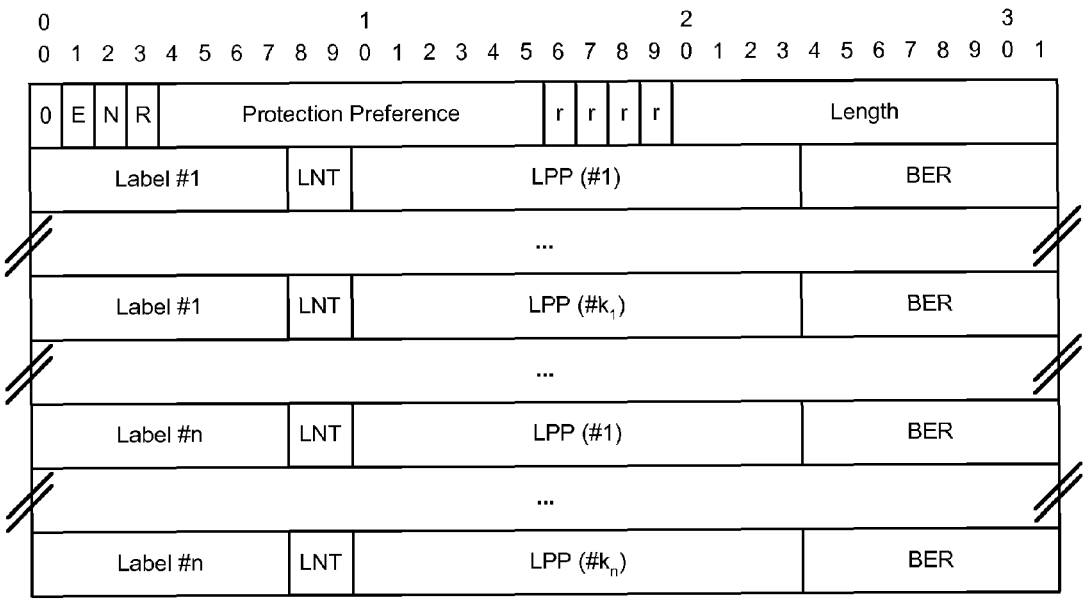
FIG. 14 illustrates a Protection Preference optional QSPEC Parameter.

The bit format of the Protection Preference optional QSPEC parameter can be seen in FIG. 14.

- Label: 8 bits. This field contains the corresponding integer value of the assigned Label. Note that a number of lines can correspond to one single Label.
- Length Notation Type (LNT): 2 bits. Indicates the measure type of the protected part's length of a given packet. 0=bit notation, 1=byte notation, 2=percentage notation, 3=reserved.
- Length of the Protected Part: 14 bits. This field indicates the length of the protected part of a given packet. The measure is given by the LNT field. Zero is a valid length.
- Bit Error Ratio (BER): 8 bits. This indicates the maximal allowed bit error ratio for each protected part in the delivered media packet. The attribute is coded with: Mantissa*$10^{-Exponent}$ (bits 1-4=Mantissa, bits 5-8=Exponent). Value zero indicates that no Bit Error Rate (BER) is specified.

Truncation Preference

Figure 15:
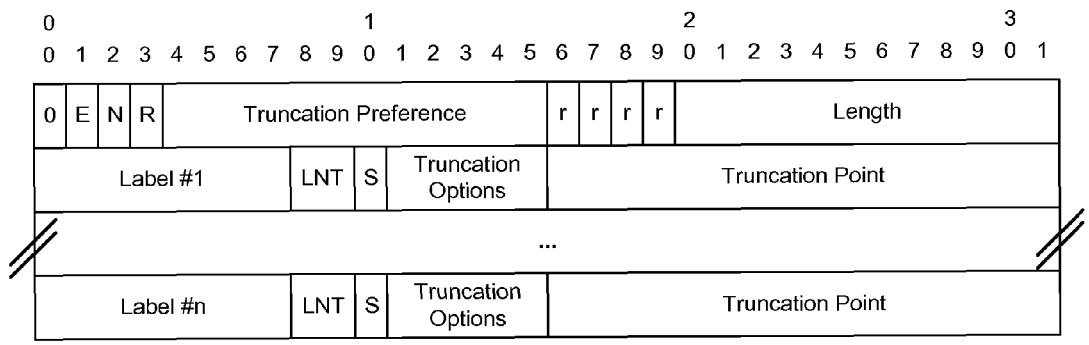
FIG. 15 illustrates a Truncation Preference optional QSPEC Parameter.

The bit format of the Truncation Preference optional QSPEC parameter can be seen in FIG. 15.

- Label: 8 bits. This field contains the corresponding integer value. Note that a number of lines can correspond to one single Label.
- Length Notation Type (LNT): 2 bits. This field indicates the type of the offset for the truncation point. 0=bit notation, 1=byte notation, 2=percentage notation (not relevant if there are several network elements, where truncation can be done), 3=reserved.
- Significant (S): 1 bit. Indicates if a media frame or a fragment is significant for the decoding process. Truncation may not be allowed for significant frames. 0=not significant, 1=significant.
- Truncation Option: 5 bits. Include detailed information about enhanced packet truncation options. The setting depends on the used media codec. 0=payload can be truncated at most till TP (must be used with LNT=0 or 1, relevant in case of FGS media) at any point defined by LNT, 1=payload can be truncated only at TP (must be used with LNT=0 or 1, this is the case when a label can be listed more than once), 2-31=reserved.
- Truncation Point (TP): 2 octets. Specifies explicit truncation points for the payload. The length notation depends on the LNT setting.

Bandwidth Partitioning

Figure 16:
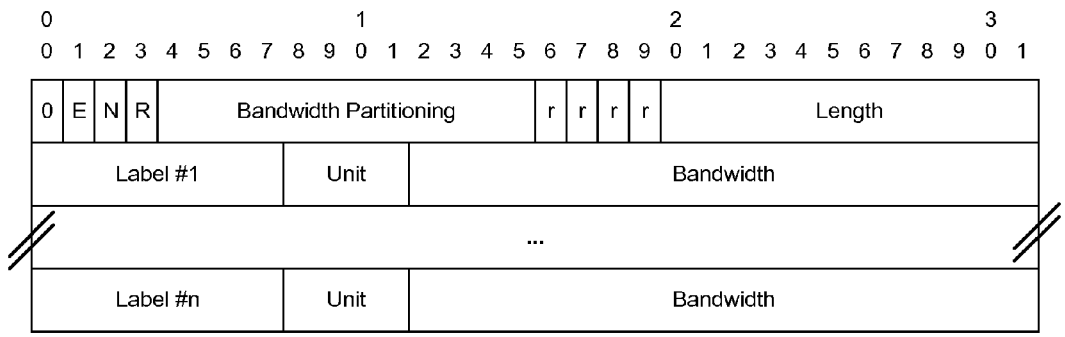
FIG. 16 illustrates a Bandwidth Partitioning optional QSPEC Parameter.

The bit format of the Bandwidth Partitioning optional QSPEC parameter can be seen in FIG. 16.

- Label: 8 bits. This field contains the corresponding integer value.

Unit: 4 bits. This field contains the identifier of the unit of the required bandwidth. 0=Byte, 1=kByte, 2=MByte, 3=GByte, 4-15=reserved.

Bandwidth: 20 bits. This field contains the amount of the required bandwidth measured in Unit.

(E) RSVP Objects for the Layer Independent Descriptor

First the proposed format of the RSVP PATH message is presented, which carries the LID-SPEC object beside others. Then the particular format of the LID-SPEC object carrying specific LID messages is presented.

Figure 17:
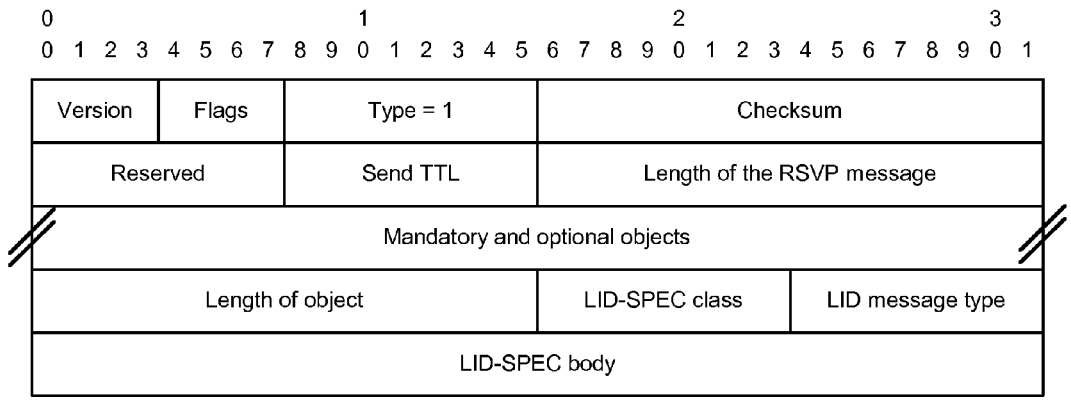
FIG. 17 illustrates a LID-SPEC Capable RSVP PATH Message.

The proposed format of the LID-SPEC capable RSVP PATH message is shown in FIG. 17. As it can be seen, the value of the LID-SPEC class (corresponding the Class-Num field of a general RSVP object) is not yet defined and it requires an IRNA registration.

The particular type of the LID-SPEC object is defined by the LID message type field. The LID-SPEC body practically equals to the particular body of the defined QSPEC objects. For the detailed LID-SPEC object examples see the following sections.

Figure 18:
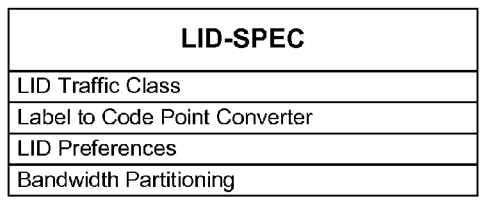
FIG. 18 illustrates the LID-SPEC Object.

The structure of the LID-SPEC object corresponds to the LID Stream management object. Only the short form of the object is presented in FIG. 18.

Every object consists of one or more 32-bit words with a one-word header. Every object is defined through a Class-Num and a C-Type. It is necessary to register a Class value for the introduced LID object by IRNA through a registration process. Since the LID-SPEC object is not mandatory, but optional and the assigned class num should have "11bbbbbb" format. The two upper bits are set to 1 denoting that the object has to be forwarded regardless of the actual implementation of the RSVP (i.e., the object can be interpreted or not). The particular type of the LID object is defined by the C-Type field.

Note that the proposed format of the LID-SPEC object is not "large" object with many fields. The LID-SPEC object should be implemented as a sequence of objects with a common Class-Num representing a LID-SPEC class. The different messages are separated with different object types (C-Type). In practice, for example, one may want to set Packet Drop Preference values, but does not need to set Truncation Preference values.

Also note, that the attribute coding is a proposal only, and does not affect the proposed mapping of LID parameters to RSVP object. Other formats of object would be readily applicable.

LID Traffic Class Object

The proposed format of the LID Traffic Class object type of the LID-SPEC object is shown in FIG. 19. The meaning of the fields corresponds to the appropriate NSIS optional QSPEC parameter, see the section above entitled "LID Traffic Class".

Label to Code Point Converter Object

The proposed format of the Label to Code Point Converter object type of the LID-SPEC object is shown in FIG. 20. The meaning of the fields corresponds to the appropriate NSIS optional QSPEC parameter, see the section above entitled "Label to Code Point Converter".

Packet Drop Preference Object

The proposed format of the Packet Drop Preference object type of the LID-SPEC object is shown in FIG. 21. The meaning of the fields corresponds to the appropriate NSIS optional QSPEC parameter, see the section above entitled "Packet Drop Preference".

Protection Preference Object

Figure 22:
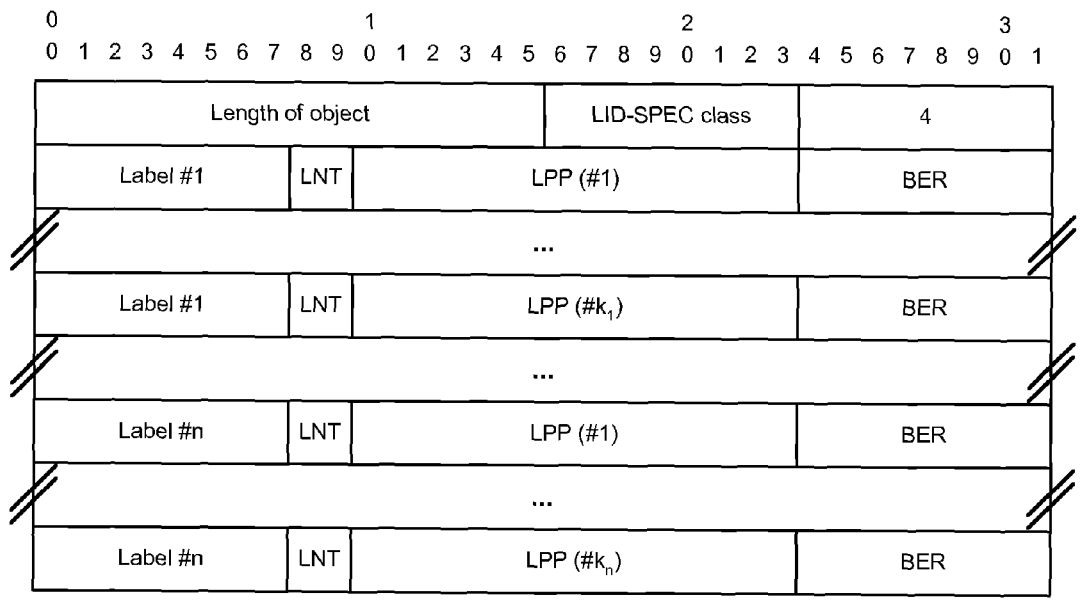
FIG. 22 illustrates a Protection Preference Object.

The proposed format of the Protection Preference object type of the LID-SPEC object is shown in FIG. 22. The meaning of the fields corresponds to the appropriate NSIS optional QSPEC parameter, see the section above entitled "Protection Preference".

Truncation Preference Object

Figure 23:
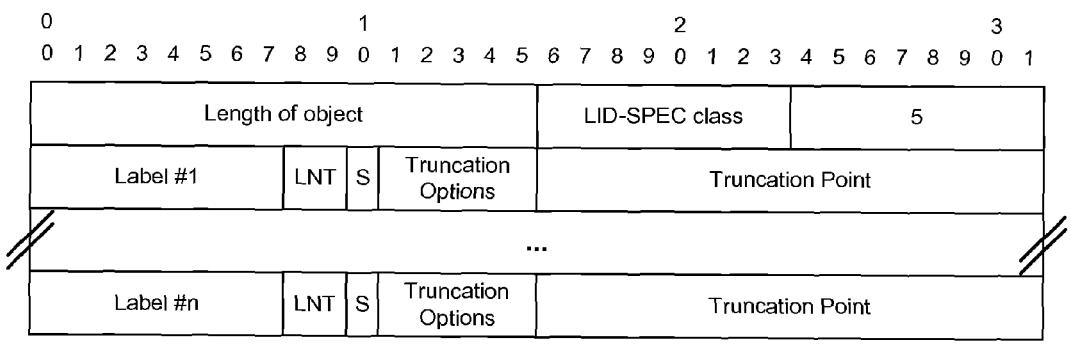
FIG. 23 illustrates a Truncation Preference Object.

The proposed format of the Truncation Preference object type of the LID-SPEC object is shown in FIG. 23. The meaning of the fields corresponds to the appropriate NSIS optional QSPEC parameter, see the section above entitled "Truncation Preference".

Bandwidth Partitioning Object

The proposed format of the Bandwidth Partitioning object type of the LID-SPEC object is shown in FIG. 24. The meaning of the fields corresponds to the appropriate NSIS optional QSPEC parameter, see the section above entitled "Bandwidth Partitioning".

It will be appreciated that operation of one or more of the above-described components can be controlled by a program operating on the device or apparatus. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

It will also be appreciated by the person of skill in the art that various modifications may be made to the above-described embodiments without departing from the scope of the present invention as defined by the appended claims.

The invention claimed is:

1. A method for use in a packet switched network, comprising carrying descriptor information relating to options for stream adaptation in the packet switched network using an existing QoS-NSLP QoS Model (QOSM) of Next Step in Signaling (NSIS) signaling protocol to embed the descriptor information, wherein NSLP is an abbreviation for NSIS Signaling Layer Protocol and wherein the descriptor information comprises Layer Independent Descriptor (LID) information and a Label to Codepoint Converter that includes:

a Label From portion including a LID label that is to be mapped to a given DiffServ Code Point value;

a Label To portion including the last LID label and corresponding DiffServ Code Point value if a given range of LID labels is to be mapped; and a Code Point portion that includes the appropriate DiffServ Code Point to which the corresponding LID label is to be mapped.

2. The method of claim 1, wherein the QOSM model used for carrying the descriptor information is a dedicated QoS-NSLP QoS Model.

3. The method of claim 1, wherein the QOSM model used for carrying the descriptor information is a non-dedicated QoS-NSLP QoS Model.

4. The method of claim 1, further comprising carrying the descriptor information in at least one dedicated QoS Specification (QSPEC) parameter.

5. The method of claim 4, wherein the dedicated QSPEC parameter is provided in a non-dedicated QSPEC object.

6. The method of claim 5, wherein the non-dedicated QSPEC object is a QoS Desired QSPEC object.

7. The method of claim 5, wherein parameters in the non-dedicated QSPEC object other than the dedicated QSPEC parameter are set to their minimum respective allowable values.

8. The method of claim 4, further comprising setting a flag in a header of the dedicated QSPEC parameter so as to indicate an at least partial lack of support for or lack of acceptance of the dedicated QSPEC parameter.

9. The method of claim 4, further comprising setting a flag in a header of the dedicated QSPEC parameter so as to indicate support for or acceptance of the dedicated QSPEC parameter.

10. The method of claim 1, further comprising carrying the descriptor information in at least one dedicated QoS Specification (QSPEC) object.

11. The method of claim 1, further comprising carrying the descriptor information in a NSIS RESERVE message.

12. The method of claim 1, comprising carrying the descriptor information in a NSIS QUERY message.

13. The method of claim 1, wherein carrying the descriptor information further comprises receiving, processing, generating, distributing, transmitting or using the descriptor information in any way.

14. The method of claim 1, wherein the descriptor information comprises cross-layer information.

15. The method of claim 1, wherein the descriptor information comprises General Cross-layer Information Forwarding (GCIF) information.

16. The method of claim 1, wherein the LID descriptor information comprises a LID Traffic Class information field and optionally any one or more of a Label to Codepoint Converter information field, a Packet Drop Preference information field, a Protection Preference information field, a Truncation Preference information field, and a Bandwidth Partitioning information field.

17. The method of claim 16, wherein the LID descriptor comprises a LID label in each information field, wherein the LID label groups the information fields in order to form the LID descriptor which describes the given stream.

18. The method of claim 1, wherein the descriptor information further comprises a LID Traffic Class that includes:
a Traffic Class portion including a traffic class category to which the descriptor is applied;
a Procedure Indicator portion including a LID distribution mode depending on an applied LID type;
a Rate Adaptation Method portion for determining which rate adaptation mechanism is to be applied on packet payloads belonging to a transmitted stream;
a Delivery of Erroneous Media Frames portion including an indication whether a corrupted media frame should be forwarded or dropped immediately; and
a Number of Labels portion including a number of valid LID labels used by the stream sending application.

19. The method of claim 1, wherein the descriptor information further comprises a Packet Drop Preference that includes the following portions:
a Label portion including a LID label;
a Significant portion including a significant bit indicating whether a carried payload of a packet is to be discarded for a decoding process;
a Frame Type portion including a type of a frame carried by the payload; and
a Drop Preference portion including corresponding importance of the frame carried by the payload.

20. The method of claim 1, wherein the descriptor information further comprises a Protection Preference that includes the following portions:
a Label portion including a LID label;
a Length Notation Type portion including a measure type of a protected part;
a Length of the Protected Part portion including a length of the protected part; and
a Bit Error Ratio portion including a maximum allowed bit error ratio for the protected part.

21. The method of claim 1, wherein the descriptor information further comprises a Truncation Preference that includes the following portions:
a Label portion including a LID label;
a Length Notation Type portion including a measure type of a protected part;
a Significant portion including a significant bit indicating whether a carried payload of a packet is to be discarded for a decoding process;
a Truncation Option portion including detailed information on enhanced packet truncation options; and
a Truncation Point portion including explicit truncation points of the payload.

22. The method of claim 1, wherein the descriptor information further comprises Bandwidth Partitioning that includes the following portions:
a Label portion including a LID label;
a Unit portion including a measure unit of required bandwidth; and
a Bandwidth portion including a measured amount of bandwidth in the measure unit.

23. The method of claim 1, wherein carrying descriptor information further comprises distributing descriptor information in the packet switched network, wherein the descriptor information relates to options for stream adaptation in the packet switched network.

24. The method of claim 1, wherein the descriptor information relates to options for media stream adaptation in the packet switched network.

25. A method for carrying descriptor information relating to options for stream adaptation in a packet switched network in a PATH SENDER-TSPEC object included in a RSVP PATH message using a RSVP signaling protocol, and wherein the descriptor information comprises Layer Independent Descriptor (LID) information and a Label to Codepoint Converter that includes:
a Label From portion including a LID label that is to be mapped to a given DiffServ Code Point value;
a Label To portion including the last LID label and corresponding DiffServ Code Point value if a given range of LID labels is to be mapped; and
a Code Point portion that includes the appropriate DiffServ Code Point to which the corresponding LID label is to be mapped.

26. The method of claim 25, further comprising carrying the descriptor information in a sender descriptor part of the RSVP PATH message.

27. The method of claim 26, further comprising using a dedicated descriptor information object in the sender descriptor part.

28. An apparatus for use in a packet switched network comprising a processor, wherein the processor is configured to carry descriptor information relating to options for stream adaptation in the packet switched network using an existing QoS-NSLP QoS Model (QOSM) of Next Step in Signaling (NSIS) signaling protocol to embed the descriptor information, and wherein the descriptor information comprises Layer Independent Descriptor (LID) information and a Label to Codepoint Converter that includes:
a Label From portion including a LID label that is to be mapped to a given DiffServ Code Point value;
a Label To portion including the last LID label and corresponding DiffServ Code Point value if a given range of LID labels is to be mapped; and
a Code Point portion that includes the appropriate DiffServ Code Point to which the corresponding LID label is to be mapped.

29. The apparatus of claim 28, wherein the processor is configured to carry descriptor information relating to options for stream adaptation in the packet switched network using the NSIS signaling protocol and the NSIS signaling protocol includes a QoS NSIS Entity (QNE).

30. The apparatus of claim 29, wherein the QNE comprises a QoS NSIS Initiator (QNI).

31. The apparatus of claim 29, wherein the QNE comprises a QoS NSIS Receiver (QNR).

32. The apparatus of claim 28, wherein the processor is further configured to perform at least one of:
- receive the descriptor information;
- process the descriptor information;
- generate the descriptor information;
- distribute the descriptor information;
- transmit the descriptor information; and
- use the descriptor information in any way.

33. An apparatus for use in a packet switched network comprising a processor, wherein the processor is configured to carry descriptor information relating to options for stream adaptation in the packet switched network in a PATH SENDER-TSPEC object included in a RSVP PATH message using a RSVP signaling protocol and the processor further comprises a RSVP Router, and wherein the descriptor information comprises Layer Independent Descriptor (LID) information and a Label to Codepoint Converter that includes:
- a Label From portion including a LID label that is to be mapped to a given DiffSery Code Point value;
- a Label To portion including the last LID label and corresponding DiffSery Code Point value if a given range of LID labels is to be mapped; and
- a Code Point portion that includes the appropriate DiffSery Code Point to which the corresponding LID label is to be mapped.

34. The apparatus of claim 33, wherein the RSVP Router includes a descriptor information broker function.

35. The apparatus of claim 33, wherein the apparatus further comprises a RSVP Host.

36. The apparatus of claim 35, wherein the RSVP Host includes user preferences and a terminal capability function.

37. The apparatus of claim 35, wherein the RSVP Host includes a codec and a third party settings function.

* * * * *

UNITED STATES PATENT AND TRADEMARK OFFICE
CERTIFICATE OF CORRECTION

PATENT NO. : 8,619,569 B2  
APPLICATION NO. : 12/670038  
DATED : December 31, 2013  
INVENTOR(S) : Godor et al.

Page 1 of 2

It is certified that error appears in the above-identified patent and that said Letters Patent is hereby corrected as shown below:

In the Specification:

In Column 10, Line 67, delete "(IRNA)." and insert -- (IANA). --, therefor.

In Column 11, Line 40, delete "IRNA." and insert -- IANA. --, therefor.

In Column 13, Line 9, delete "Host 210" and insert -- Host 200 --, therefor.

In Column 14, Line 36, delete "2." and insert -- $2^{nd}$ --, therefor.

In Column 15, Line 3, delete "IRNA." and insert -- IANA. --, therefor.

In Column 15, Line 7, delete "missing form" and insert -- missing from --, therefor.

In Column 17, Line 16, delete "IRNA" and insert -- IANA --, therefor.

In Column 17, Line 28, delete "IRNA" and insert -- IANA --, therefor.

In the Claims:

In Column 18, Line 40, in Claim 1, delete "DiffSery" and insert -- DiffServ --, therefor.

In Column 18, Line 42, in Claim 1, delete "DiffSery" and insert -- DiffServ --, therefor.

In Column 18, Line 44, in Claim 1, delete "DiffSery" and insert -- DiffServ --, therefor.

In Column 19, Line 11, in Claim 12, delete "comprising" and insert -- further comprising --, therefor.

In Column 20, Line 38, in Claim 25, delete "DiffSery" and insert -- DiffServ --, therefor.

In Column 20, Line 40, in Claim 25, delete "DiffSery" and insert -- DiffServ --, therefor.

Signed and Sealed this  
Fifteenth Day of July, 2014

Michelle K. Lee  
*Deputy Director of the United States Patent and Trademark Office*

In Column 20, Line 42, in Claim 25, delete "DiffSery" and insert -- DiffServ --, therefor.

In Column 20, Line 61, in Claim 28, delete "DiffSery" and insert -- DiffServ --, therefor.

In Column 20, Line 63, in Claim 28, delete "DiffSery" and insert -- DiffServ --, therefor.

In Column 20, Line 65, in Claim 28, delete "DiffSery" and insert -- DiffServ --, therefor.

In Column 22, Line 6, in Claim 33, delete "DiffSery" and insert -- DiffServ --, therefor.

In Column 22, Line 8, in Claim 33, delete "DiffSery" and insert -- DiffServ --, therefor.

In Column 22, Line 10, in Claim 33, delete "DiffSery" and insert -- DiffServ --, therefor.